(12) United States Patent
Dane et al.

(10) Patent No.: US 7,960,671 B2
(45) Date of Patent: Jun. 14, 2011

(54) LASER SHOCK PROCESSING WITH MOMENTUM TRAP

(75) Inventors: C. Brent Dane, Livermore, CA (US);
Lloyd Hackel, Livermore, CA (US);
Fritz B. Harris, Rocklin, CA (US);
Chanh H. Truong, Hayward, CA (US);
James D. Wintemute, Livermore, CA (US)

(73) Assignee: Metal Improvement Company LLC, Paramus, NJ (US)

( * ) Notice: Subject to any disclaimer, the term of this patent is extended or adjusted under 35 U.S.C. 154(b) by 1223 days.

(21) Appl. No.: 11/608,210

(22) Filed: Dec. 7, 2006

(65) Prior Publication Data

US 2007/0138157 A1    Jun. 21, 2007

Related U.S. Application Data

(60) Provisional application No. 60/752,425, filed on Dec. 20, 2005.

(51) Int. Cl.
*B23K 26/00* (2006.01)
(52) U.S. Cl. .............. 219/121.85; 148/565; 415/232
(58) Field of Classification Search .............. 219/121.65, 219/121.66, 121.68, 121.69, 121.84, 121.85; 148/525; 415/232
See application file for complete search history.

(56) References Cited

U.S. PATENT DOCUMENTS

| | | | |
|---|---|---|---|
| 3,667,911 A * | 6/1972 | Balchan et al. | 423/446 |
| 3,668,168 A | 6/1972 | Self | |
| 4,401,477 A | 8/1983 | Clauer et al. | |
| 5,020,001 A | 5/1991 | Yamamoto et al. | |
| 5,131,957 A * | 7/1992 | Epstein et al. | 148/565 |
| 5,239,408 A | 8/1993 | Hackel et al. | |
| 5,674,329 A * | 10/1997 | Mannava et al. | 148/525 |
| 5,686,689 A * | 11/1997 | Snedeker et al. | 89/36.02 |
| 5,741,559 A * | 4/1998 | Dulaney | 427/554 |
| 6,078,022 A * | 6/2000 | Dulaney et al. | 219/121.85 |
| 6,292,584 B1 | 9/2001 | Dulaney et al. | |
| 6,559,415 B1 * | 5/2003 | Mannava et al. | 219/121.85 |

(Continued)

FOREIGN PATENT DOCUMENTS

WO    0196619    12/2001

OTHER PUBLICATIONS

International Search Report for PCT Application PCT/US06/62262.

(Continued)

*Primary Examiner* — Samuel M Heinrich
(74) *Attorney, Agent, or Firm* — Haynes Beffel & Wolfeld LLP

(57) ABSTRACT

A method for laser shock processing a device, including a metallic body having a surface, comprises conformally applying a compliant solid material to the first region on the surface of the metallic body and applying a layer of ablative material to the second region on the surface of the metallic body. A damping liquid is flowed over the layer of ablative material. An array of pulses of laser energy is directed through the damping fluid to impact the layer of ablative material on the surface and peen the surface in the second region. The pulses induce pressure waves within the metallic body which propagate to the surface in the first region. The compliant solid material acts as a momentum trap, so that the acoustic waves are at least partially coupled into the compliant solid material and attenuated outside of the metallic body.

33 Claims, 8 Drawing Sheets

U.S. PATENT DOCUMENTS

| | | |
|---|---|---|
| 6,599,983 B2 | 7/2003 | Irii et al. |
| 6,629,464 B2 | 10/2003 | Suh et al. |
| 6,805,970 B2 | 10/2004 | Hackel et al. |
| 6,811,149 B1 | 11/2004 | Johnson |
| 7,268,317 B2 * | 9/2007 | Tenaglia et al. .......... 219/121.85 |

OTHER PUBLICATIONS

Clauer et al., "Effects of Laser Induced Shock Waves on Metals," Shock Waves and High-Strain-Rate Phenomena in Metals (1981), Chapter 38, Plenum Publishing Corporation, New York.

http://www.cromptoncorp.com/epdm.html, 2 pp, Nov. 1, 2005.

Fairand et al., "Laser shock-induced microstructural and mechanical property changes in 7075 aluminum," J.Appl. Phys., 43:9, Sep. 1972, 3893-5.

Dow Corning product brochure for Sylgard, "Information About High Technology Silicone Materials," 6pp.

* cited by examiner

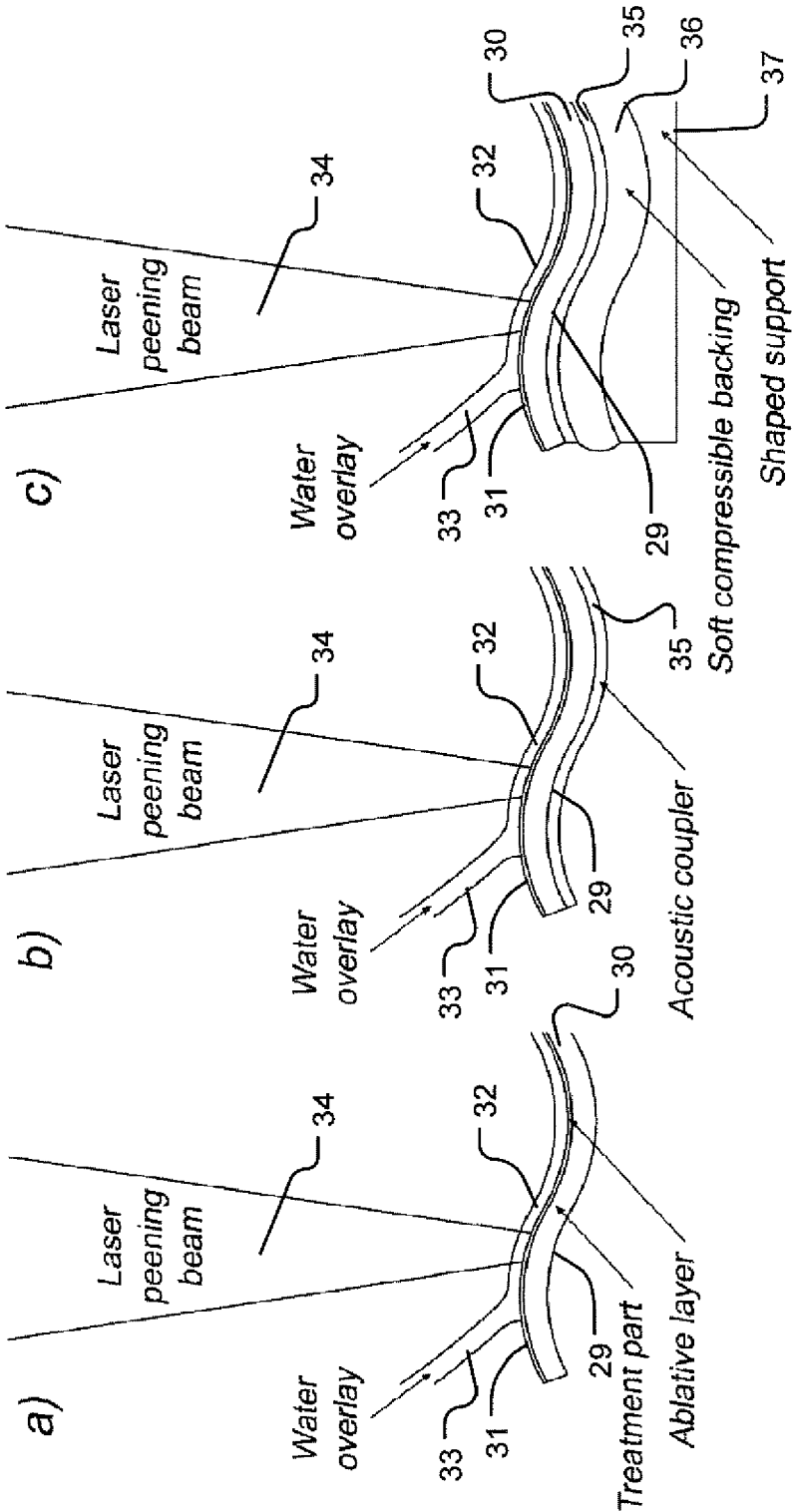

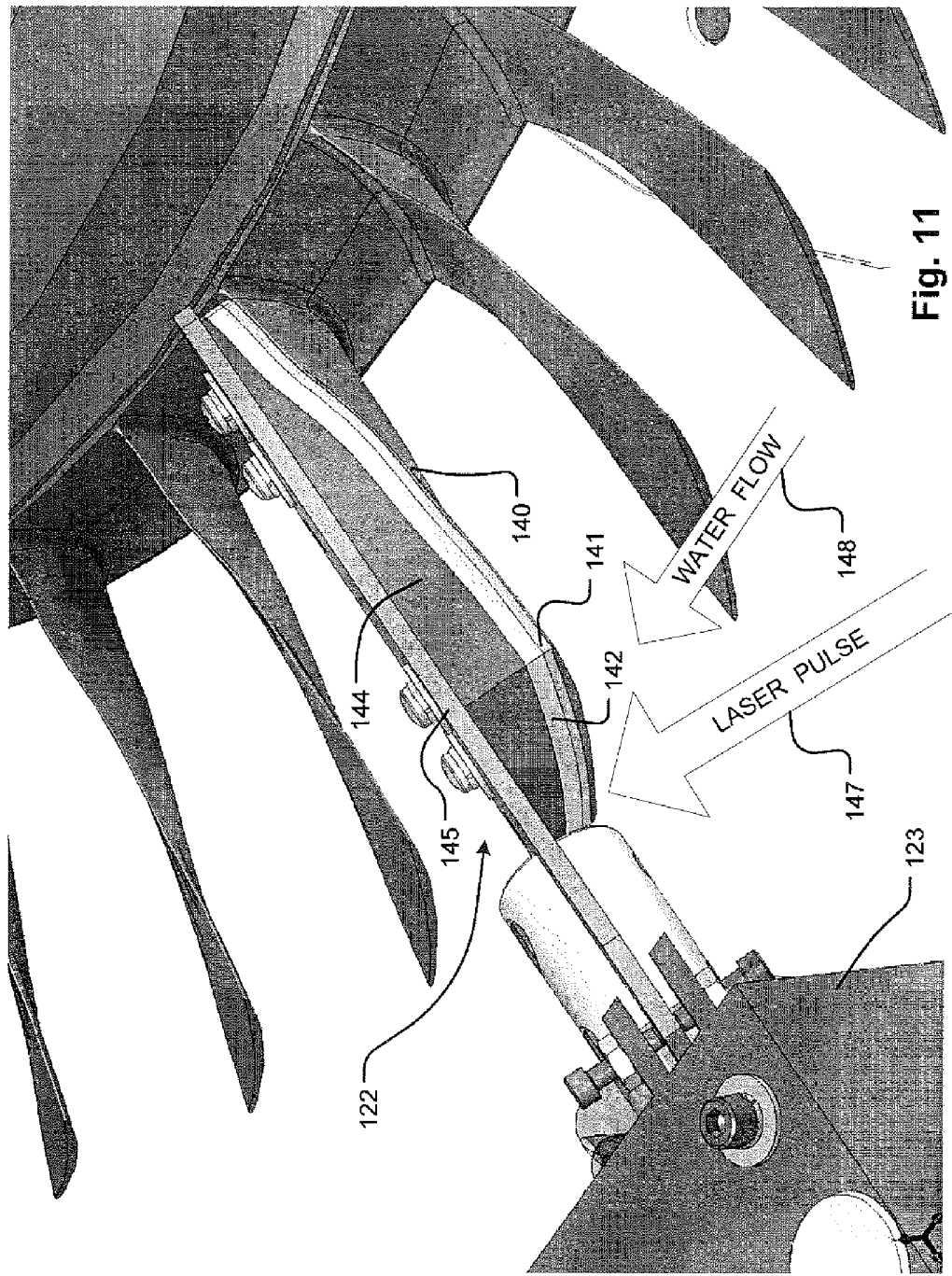

LASER SHOCK PROCESSING WITH MOMENTUM TRAP

RELATED APPLICATIONS

This application claims the benefit of U.S. Provisional Patent Application No. 60/752,425 filed on 20 Dec. 2005.

BACKGROUND OF THE INVENTION

1. Field of the Invention

The present invention relates to high energy laser systems, to beam delivery systems, and to laser peening systems suitable for use with stationary targets.

2. Description of Related Art

The use of mechanical shocks to form metals and to improve their surface properties has been realized for ages. In current industrial practice, a peening treatment of metal surfaces is accomplished by using high velocity shot. Treatment improves surface properties and, very importantly for many applications, results in a part displaying significantly improved resistance to fatigue and corrosion failure. A wide range of workpieces are shot peened in the aerospace and automotive industries. However, for many applications, shot peening does not provide sufficiently intense or deep treatment, or cannot be used because of its detrimental effect on the surface finish.

With the invention of the laser, it was rapidly recognized that the intense shocks required for peening, or other processing, could be achieved by means of a laser-driven, tamped plasma. B. P. Fairand, et al., "Laser Shot Induced Microstructural and Mechanical Property Changes in 7075 Aluminum," Journal of Applied Physics, Vol. 43, No. 9, p. 3893, September 1972. Typically, a plasma shock of 10 kB to 30 kB is generated at metal surfaces by means of high energy density (about 200 j/cm$^2$), short pulse length (about 30 nanoseconds) lasers. A thin layer of metal tape, black paint or other absorbing material on the metal surface provides an absorber to prevent ablation of the metal. A confining or tamping material such as water covers the surface layer providing an increased intensity shock. During the process of laser peening, an intense pressure pulse propagates into the part. If the internal pressure of the metal subjected to this pulse exceeds its elastic limit, plastic deformation occurs. Surrounding material not impacted by the pressure wave resists the resulting deformation, leaving a residual compressive stress in the treated volume. In testing, this treatment has been shown to be superior for strengthening workpieces from fatigue and corrosion failure. Laser peening is also used for forming and texturing surfaces.

One laser system which has been utilized for this purpose is described in our prior U.S. Pat. No. 5,239,408, entitled HIGH POWER, HIGH BEAM QUALITY REGENERATIVE AMPLIFIER. The laser system described in the just cited '408 patent comprises a high power amplifier in a master oscillator/power amplifier MOPA configuration capable of producing output pulses greater than 20 Joules per pulse with the pulse width on the order of 10 to 30 nanoseconds or less using a wavefront correcting configuration based on a stimulated Brillouin scattering SBS phase conjugator/mirror system.

There are several aspects of the laser peening acoustic wave that impact the effectiveness of the process and the depth and magnitude of the residual compressive stress. In the simplest description, as above, a pressure pulse propagates into the material. However, there are also traveling tensile waves that affect the process. At the end of the laser-induced pressure pulse, the elastic component of the material displacement causes the surface to rebound. This launches a tensile pulse (sometimes referred to as a rarefaction wave) into the metal, propagating just behind the compression pulse. Since the tensile pulse is traveling through higher density material, just previously compressed by the pressure pulse, it propagates faster and can eventually overtake the pressure pulse and thereby reduce its magnitude. The combination of this phenomenon with the natural spread (diffraction) of the acoustic wave, limits the depth of plastic deformation that can be achieved in a thick (approximately >5 mm) sample.

In a thin section (approximately <5 mm), the interaction of the acoustic waves inside the part becomes more complex. When the pressure pulse reaches the opposite side of the component, it causes an outward displacement of the unconstrained back surface, resulting in a reflected tensile pulse that propagates back into the metal. In a way analogous to the front surface, the back surface then rebounds, generating a counter-propagating pressure pulse that follows the reflected tensile pulse. Another description of this process is that of the simple reflection of the acoustic wave from the back surface of the part. Since the speed of sound is higher in the metal than in air, the resulting impedance mismatch causes the reflected wave to be inverted, as just described.

The reflected tensile wave has a number of undesirable effects. First, it can interact with the forward-going compression wave adjacent to the reflection boundary, reducing its magnitude and limiting the ability to generate through-thickness residual compressive stress. Of more concern, however, is the possibility that the reflected tensile pulse combines with the forward propagating tensile pulse (described above) in the interior of the part. In a process called spalling, the sum of these two tensile waves can exceed the yield strength of the material and cause internal cracks, distributed through the thickness.

The reflection of acoustic waves from the interior surfaces of a component can be suppressed by placing a block of similar material (same speed of sound) in intimate contact with the surface of concern. See, U.S. Pat. No. 4,401,477 by Clauer et al. This block of material is often referred to as a momentum trap. In one approach, the trap material is a relatively thin spring-loaded disk, the displacement of which is intended to carry off the momentum of the impinging wave. In a second approach, the trap is sufficiently large to allow the acoustic waves coupled out from the treated part to dissipate before encountering another material boundary. However, reentrant geometries or closely spaced components (such as fixed jet engine compressor blades) may provide space limitations that rule out large momentum traps.

The challenge in both cases is to achieve a very accurate shape to provide intimate contact to parts with complex surface geometries and to maintain this contact on a consistent basis during processing. Placing a liquid metal (e.g. mercury) or a liquid slurry of metal particles in a thin film between the momentum dump and the processed part has been proposed. See, U.S. Pat. No. 6,805,970 by Hackel et al.

Another approach to the design of a momentum trap uses flowing liquids. Flowing liquids clearly have the advantage of being able to readily conform to complex shapes. However, the difference in sound speed between the metal and the liquid does not provide an optimal impedance match and some reflection still takes place. Furthermore, the thickness of the flowing liquid stream is limited by the viscosity and surface tension characteristics of the liquid, typically to no more than a few millimeters. The acoustic absorption losses in the liquid are small and therefore reflections from the liquid/air interface on the backside of the water stream also remain a concern. The Hackel et al. patent cited above proposes replacing water as a momentum trap liquid with Fluorinert™, a chemically stable fluorocarbon with a density of almost twice that of water. However, this is still only half the density of a typical titanium alloy and the issues of impedance matching and layer thickness remain.

The direct use of liquid metals, such as mercury, either flowing in a stream or held in a reservoir against the back of the part, has been suggested. See, U.S. Pat. No. 6,559,415 by Mannava et al. In the same patent, the direct use of lubricants containing a slurry of metal powder is also proposed. These are clearly not practical approaches due to issues of process cell contamination by the airborne dispersal of the liquid material during the peening process, and due to the difficulty of recovery and reuse of these fluids.

It is desirable therefore to provide a momentum trap design suitable for use in manufacturing devices including metallic bodies that are laser peened.

SUMMARY OF THE INVENTION

A laser shock processing method and system is described which includes a momentum trap comprising a compliant solid material. The momentum trap couples shock waves out from parts being processed. Unlike previous approaches that use flowing liquids, spring-loaded metal plates, or metal blocks index-matched with thin liquid films, a compliant solid material, such as a metal-filled elastomer or other high-density matrix of metallic particles uniformly dispersed in a compliant binder, is utilized as the momentum trap. The density of the compliant solid material is adjusted to a sufficiently close match with that of the metallic body to be laser shock processed. Even though the elastomers used as binders for the compliant solid material in embodiments described herein will have a very different modulus of elasticity than that of the metallic body, on the nanosecond time-scales of the laser pulses used for laser peening, the impedance match between the momentum trap and the metallic body to be processed has proven adequate. The compliant solid material is placed in contact with the surface of the body being peened, acoustically coupling the longitudinal density waves generated by laser peening into the momentum trap, effectively allowing the waves to be transmitted past internal surfaces of the metallic body and greatly attenuating the reflected tensile and compressive waves. In addition to acting as a momentum trap, embodiments of the compliant solid material act as an acoustic absorber of the pressure waves that are coupled out of the body, preventing additional reflections and other problems with dissipating the energy.

The flexibility of the compliant solid material makes it conformable to complex geometric shapes on metal bodies being processed. The use of the compliant solid material as a momentum trap prevents internal cracks due to spalling, and results in higher overall residual compressive stress through a sample thickness as compared to systems that do not use the momentum trap. Also, painted coatings on the back sides of metallic bodies can be applied before processing in some embodiments because they are not removed by pressure waves within the metallic body caused by the laser pulses.

Other aspects and advantages of the present invention can be seen on review of the drawings, the detailed description and the claims, which follow.

BRIEF DESCRIPTION OF THE DRAWINGS

FIG. 2 illustrates laser peening a thin section of a metallic body according to the prior art.

FIG. 3 illustrates laser peening a thin section of a metallic body with an impedance matched, elastomer momentum trap.

FIG. 4 illustrates laser peening a thin section of a metallic body with an impedance matched, elastomer momentum trap and supporting structures.

FIG. 11 illustrates a close up view of the momentum trap structure of FIG. 10.

DETAILED DESCRIPTION

Figure 1:
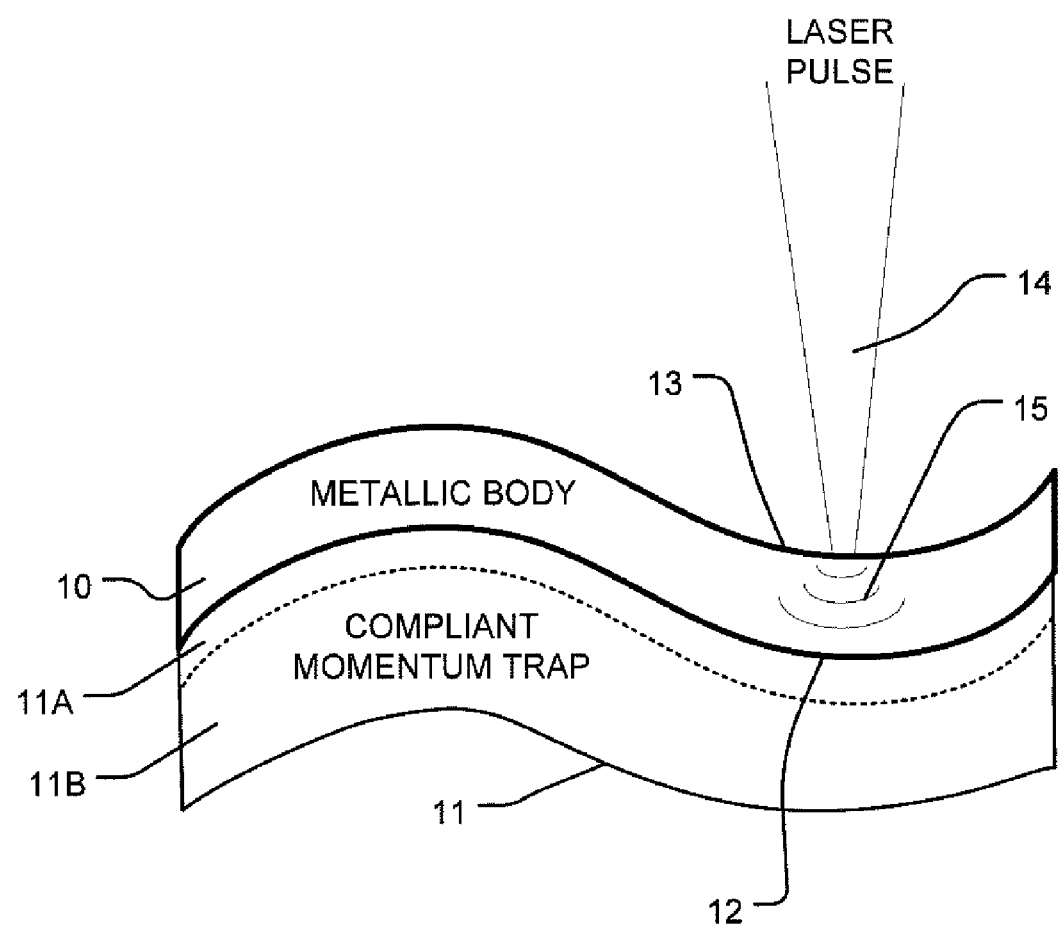
FIG. 1 illustrates a laser peening system including a momentum trap comprising a compliant solid material.

A detailed description of embodiments of the present invention is provided with reference to the FIGS. 1-11.

Laser peening is applied to devices that comprise metallic bodies that can have complex shapes. For example, turbine blades for jet engines have curved air foil shapes with bases that also have complex shapes. A compliant elastomer momentum trap is described which can be used with metallic bodies having complex shapes. An elastomer is an elastic rubber-like or rubber-based substance (as a synthetic rubber or a plastic having some of the physical properties of natural rubber). Representative elastomers which can be used for a momentum trap as described herein include silicones, urethanes, and ethyl propylene diene monomers EPDMs. The use of a compliant elastomer is of great advantage since it can readily conform to complex surface shapes. Since it is a solid, it can also be fashioned in any desired thickness, without the constraints associated with flowing liquids. Finally, the molecular structure of such polymers causes them to have high acoustic absorption, minimizing concerns of additional reflections within the momentum dump material. The internal absorption of the sound waves eliminates the need to provide long propagation distances inside the momentum dump that are needed in low absorption media such as metals or liquids.

In order to efficiently couple the acoustic wave out of the treatment piece and into the momentum dump, the acoustic impedance match between the two materials needs to be closely matched. This condition is satisfied when the speed of sound is the same in both materials. In general, the speed of sound in a solid is equal to sqrt($E/\rho$) where E is the modulus of elasticity (Young's modulus) and $\rho$ is the material density.

An embodiment of the compliant elastomer momentum trap comprises an elastomer binder that is modified to adjust the effective material density $\rho$. For example, the density $\rho$ is adjusted by filling the compliant binder material with a matrix of metallic powder. For example, typical molded silicones have densities in the range of 1 to 1.5 g/cc. By adding a uniformly dispersed mixture of more dense materials, such as atomized nickel (8.8 g/cc) or silver (10.5 g/cc) particles (or other atomized metal powders), the density of the composite can be raised to approximately match that of a metallic body, like a titanium alloy (4.5 g/cc). The result is a high-density material that still exhibits the flexibility of an elastomer.

Given a similar density, the second requirement for a good impedance match is the modulus of elasticity. One might conclude that the comparison of a compliant elastomer to a high strength metal alloy would be a meaningless exercise. However, it is important to consider that the modulus of such polymers is highly dependent on the strain rate. A classic example with which most are familiar is the childhood toy Silly Putty. As a soft material, it can be easily shaped and molded. However, when rolled into a ball, it bounces from the floor with little plastic deformation (it remains round). If struck with a hammer, it actually shatters into small pieces. The elastic modulus of the putty is highly dependent on the time scale over which the strain is applied. In the case of laser peening, strain is applied on a time scale measured in tens of nanoseconds. The modulus of elasticity of elastomers at these rates is difficult to know or measure. However, given the very successful application of the acoustic coupling material described in this invention disclosure (evidenced by measured laser peening performance), the compliant elastomer momentum trap clearly has an effective acoustic impedence matching that of the metallic body that is sufficient to couple a significant proportion of the energy of the traveling waves out of the workpiece.

The compliant acoustic coupler also has important applications other than the laser peening of thin sections. There are many instances in the laser peening or other laser shock processing of complex geometries when it is useful to prevent the internal reflection of acoustic waves. The basic configuration of a device comprising a metallic body 10 with a compliant momentum trap 11 is illustrated in FIG. 1. The metallic body has a surface with a complex shape. The momentum trap is applied to a first region 12 on the surface of the body. A second region 13 on the surface of the body 10 is laser peened, by coating it with an ablative material and directing an array of high intensity laser pulses 14 on the second region. For example, pulses having energies greater than 1 joule per pulse with the pulse width less than 30 nanoseconds and an area (spot size) on the surface to be peened on the order of 1 to 25 mm$^2$. Peak irradiance on the order of GigaWatts per cm$^2$ (GW/cm$^2$) are applied for laser peening, including for example higher than 0.5 GW/cm$^2$. Peak irradiance of 10 GW/cm$^2$, or higher depending on the tamping material used, can be applied. Pressure waves 15 are induced inside the body and propagate from the second region to the first region, where the momentum trap is acoustically coupled to the first region 12. The pressure waves are thus coupled out of the body to a sufficient degree that reflection of the waves from the internal side of the first region is reduced or even substantially eliminated, so that undesirable spalling or other effects of the reflections are prevented. The compliant momentum trap 11 in the illustrated embodiment comprises a high density, acoustic impedance matched layer 11A in contact with the first region 12 of the surface of the body and a compliant, less dense layer 11B, useful for applying conforming pressure on the momentum trap 11 to induce intimate contact needed for coupling the pressure waves out of the body 10.

FIGS. 2-4 illustrate application of a compliant momentum trap 35 to a thin section 30 of a treatment part comprising a metallic body, where a thin section for a body comprising titanium alloy or similar metal can be considered to be about 5 mm or less thick. For example, a portion of an airfoil shaped turbine blade for a jet engine near the trailing edge can have a thickness less than 5 mm.

In FIG. 2, a prior art configuration is shown, without the compliant momentum trap. The thin section 30 is coated with an ablative material 31 on the region to be peened. A layer 32 of water from a water source 33 is flowed over the region to be peened. An array of laser pulses 34 is directed over the ablative material to peen the part. The region 29, opposite the region to be peened on the thin section, has an acoustic mismatch with the surrounding environment, and can cause internal reflections of the pressure waves or otherwise affect the region 29 in ways that deform the thin section.

In FIG. 3, a compliant momentum trap 35 is applied to the region 29 on the thin section. The compliant momentum trap is applied in intimate contact with the region 29, so that a substantial portion of the energy of the pressure waves is coupled into the momentum trap 35, and dissipates outside of the thin section 30.

FIG. 4 illustrates a configuration with a softer, compressible backing 36 on the momentum trap 35. The softer, compressible backing facilitates application of force to the compliant momentum trap to cause intimate contact with the region 29 opposite the region to be peened. A support structure 37 supports the backing 36 and the momentum trap 35 during peening. The support structure 37 is shaped in a manner that matches the shape of the region 29 sufficiently, so that the backing 36 and momentum trap 35 fit between the structure 37 and the thin section 30, in a compressed state applying sufficient force that intimate contact needed for the coupling of the momentum trap 35 to affected region 29 on the surface is established. Schematic illustration of the compliant acoustic coupler.

Thus, FIG. 2 shows a conventional laser peening of a shaped part using a water tamping layer flowing over an ablative layer. FIG. 3 illustrates the addition of the compliant acoustic coupler, which attenuates internal reflections from the backside of the part. Good contact is required between the part and the elastomer material. This can be achieved as shown in FIG. 4 using a layer of soft compressible material between the coupler and a shaped rigid support. The compliant elastomer material is placed in intimate contact with the surface of the treatment part. One way to achieve placement of the compliant elastomer in intimate contact with the surface of the treatment part, as shown in FIG. 3, is to back a layer (2-3 mm) of the metal-filled elastomer with an even softer, more compliant material, such as foam rubber or a low durometer silicone or urethane. This compressible cushion provides a continuous holding force across the part. The magnitude of the holding force is less important than maintaining gap-free contact. The inertia of the acoustic coupling material provides the primary resistance to motion on the short time scale of the applied pressure pulse.

Using this compliant holding method, the system can readily conform to a range of different shapes. As also shown in FIG. 4, the contact is further enhanced if the two layer absorber is attached to a secondary back plate whose shape approximates that of the part to be laser peened, such as for example a jet engine compressor blade. The soft backing material can be replaced with an inflatable bladder to provide adaptability to a wider range of surface shapes without requiring custom tool fabrication. Since the elastomer binders can be easily cast in a mold, more complex 3-D geometries can be accommodated by casting the material using an accurate replica of the part or onto an actual sample of the part itself.

Figures 5, 6:
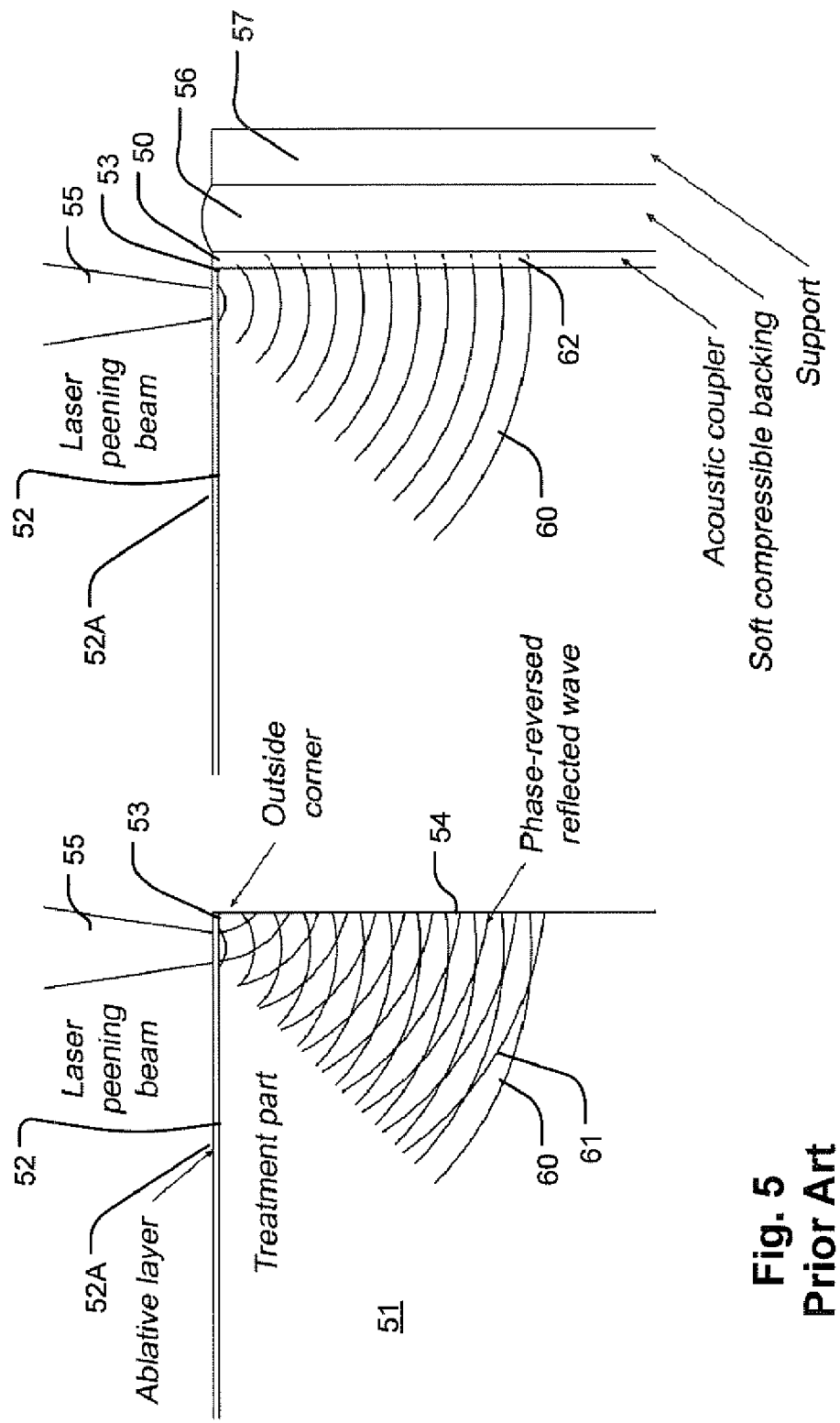
FIG. 5 illustrates laser peening an outside corner shape on a metallic body according to the prior art.
FIG. 6 illustrates laser peening an outside corner shape on a metallic body with an impedance matched, elastomer momentum trap and supporting structures.

Schematic illustration of the use of the acoustic coupler in a geometry other than a thin section is provided in FIGS. 5 and 6. FIGS. 5 and 6 illustrate application of a compliant momentum trap 50 to an outside corner shape on a metallic body 51. FIG. 5 illustrates a prior art configuration in which the metallic body 51 has a surface region 52 with ablative layer 52A along one side of the corner 53. The laser peening beam 55 impacts the region 52, through a water layer not shown, causing explosive plasma generation in the ablative layer 52A and resulting internal pressure waves 60. On the other side of the corner 53, a surface region 54 can cause internal reflection of pressure waves 60, and induce phase-reversed reflected waves 61 within the body 51. The divergence of the acoustic wave causes it to impinge on the interior surface of the side face not being peened. The internal reflection of the pressure wave back into the part can interfere with the primary peening wave, producing unwanted distributions in the plastic deformation and hence, in the residual stress. Further, the internal reflection of a tensile wave (see previous discussion) could serve to relieve residual compressive stress that has been generated on this surface during a previous laser peening operation.

FIG. 6 illustrates application of a compliant elastomer momentum trap 50 to the region 54. A compressible layer 56 and support structure 57 backs the trap 50 as discussed above to distribute force, causing contact with the surface region 54 sufficient for coupling energy of the pressure waves 60 out of the body 51, and to reduce or eliminate the reflected waves 61 shown in the prior art configuration of FIG. 5. The waves 60 are coupled into the momentum trap 50 as schematically illustrated by lines 62, and dissipate without significant internal reflections.

FIGS. 5 and 6 are provided as only one example of many geometric features, including as examples edges, corners, filets and holes, with which the use of the acoustic coupler will be advantageous.

Figure 7:
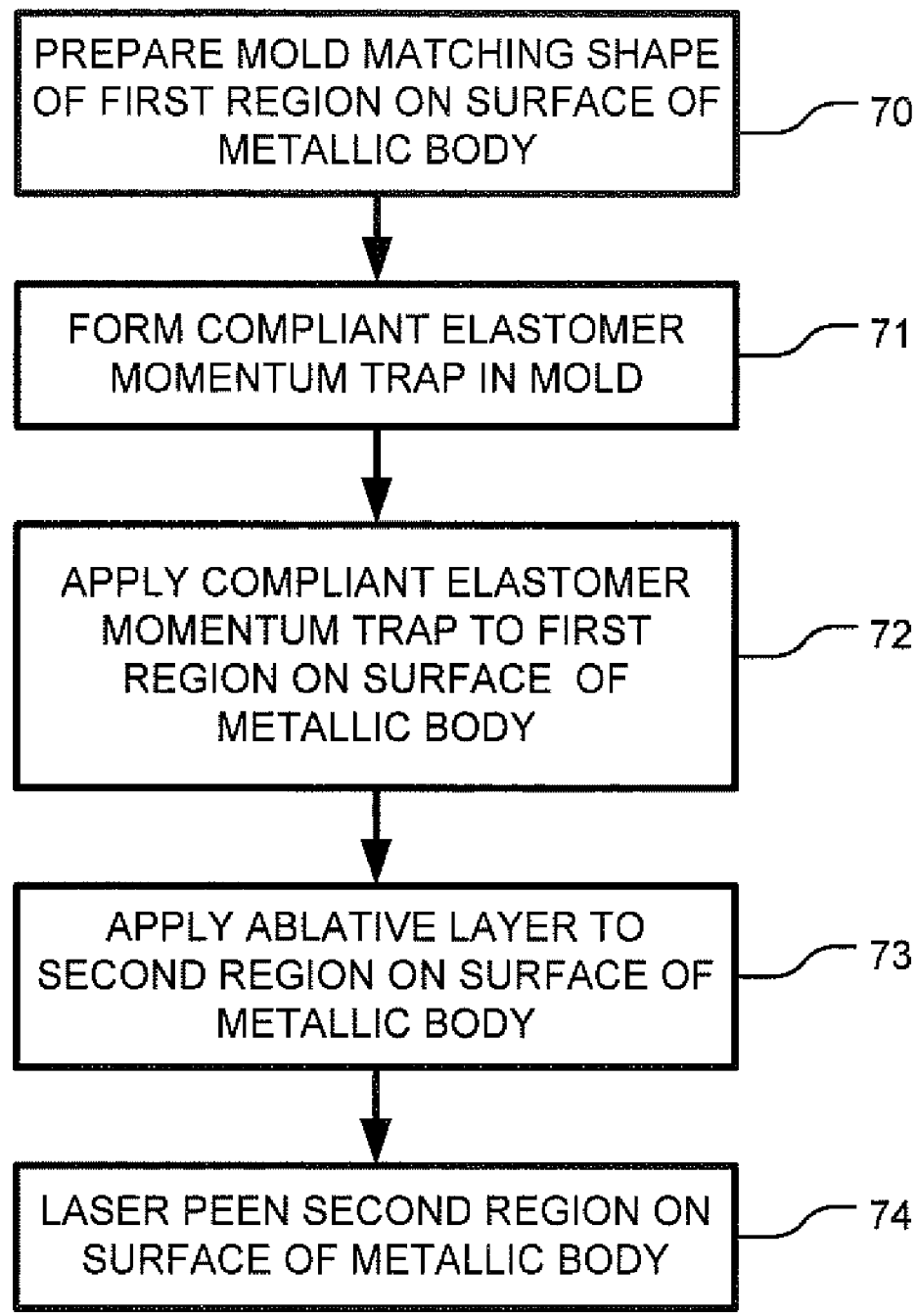
FIG. 7 is a flow chart of a manufacturing process including laser shock processing.

A flow chart for a basic manufacturing method for a laser peened device comprising a metallic body is illustrated in FIG. 7. The method includes preparing a mold matching the shape of a first region on a surface of a metallic body (step 70). A compliant elastomer momentum trap is formed in the mold (step 71). The compliant elastomer momentum trap is applied to the first region on the surface of the metallic body (step 72). An ablative layer (e.g. black tape) is applied to a second region on the body (step 73). Finally, the second region on the body is laser peened (step 74).

Figure 8:
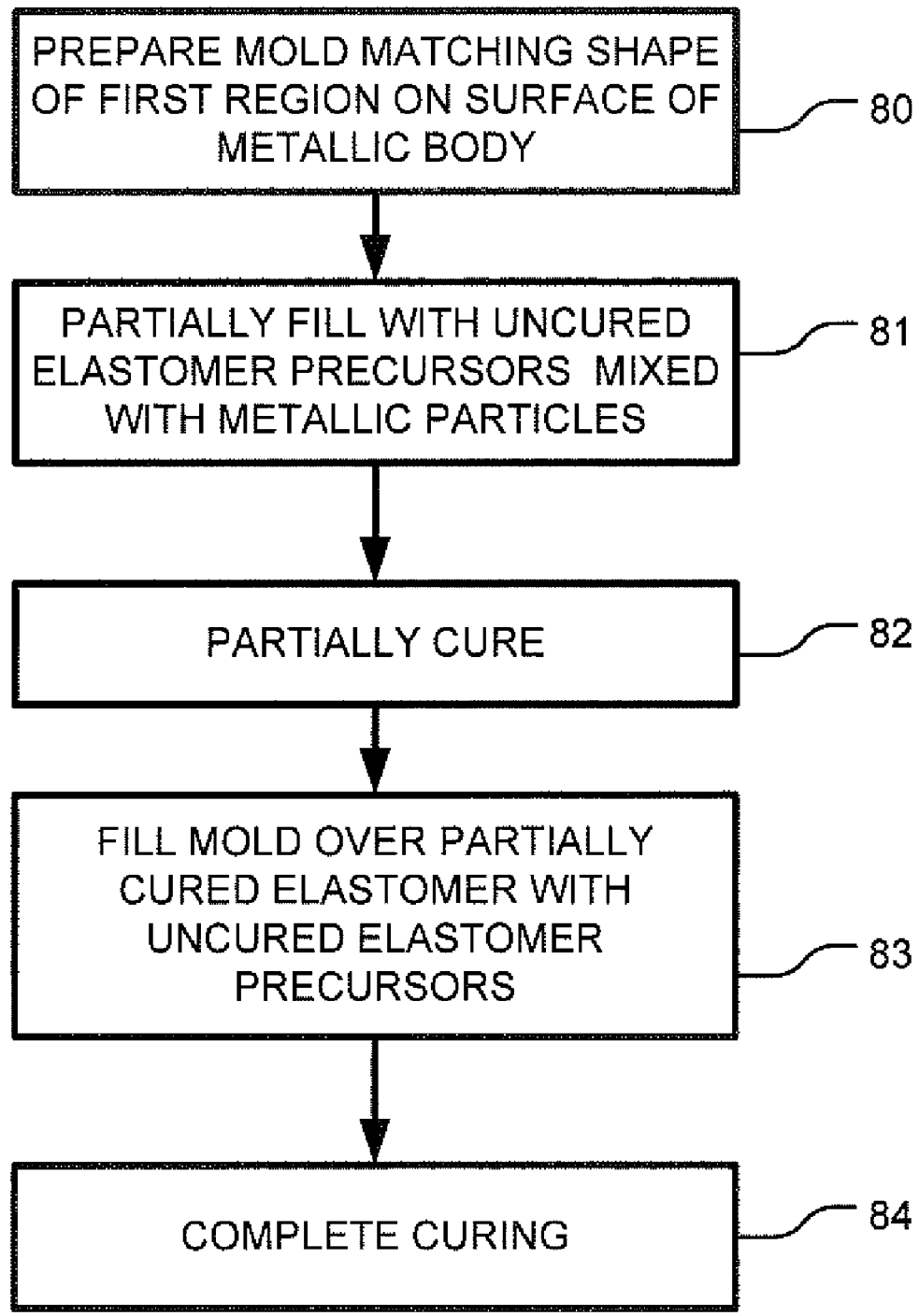
FIG. 8 is a flow chart of a manufacturing process for manufacturing a momentum trap comprising a multi-layer, impedance-matched elastomer.

FIG. 8 illustrates a process flow for making a compliant elastomer momentum trap within a mold, with an integrated compressible backing. The process includes preparing a mold matching the shape of the first region on the surface of the metallic body to be laser peened (step 80). The mold is partially filled with uncured elastomer precursors, such as commercially available elastomer material kits, mixed with metallic particles, such as commercially available atomized nickel, stainless steel, or silver, to increase the density of the elastomer (step 81). For example, the mold can be partially filled with a mixture of elastomer precursors, such as urethane precursors, folded together with metallic particles sufficient to form a high density layer about 0.04 to 0.10 inches (1.0 to 2.5 mm) thick on the region in the mold adapted to couple with the surface of the metallic body. In one example, the mixture comprises about four parts metallic particles to one part elastomer precursors by weight. Then the mixture is cured partially, stopping the curing before the material is completely formed (step 82). Next, the rest of the mold is filled with elastomer precursors without metallic particles, or with a less dense mixture of materials sufficient to form a lower density elastomer layer, about ¼ inch thick for shapes like turbine blades (step 83). Finally, the curing of the elastomer mixture is completed (step 84). When the cured elastomer structure is removed from the mold, a two layer elastomer momentum trap results. The momentum trap is mounted with a back plate that is secured to the metallic body being peened. Elastomers other than urethane can be utilized as well. Candidate elastomers include EPDMs and silicones such as "Sylgard" products available from Dow Corning of Midland, Mich.

Figure 9:
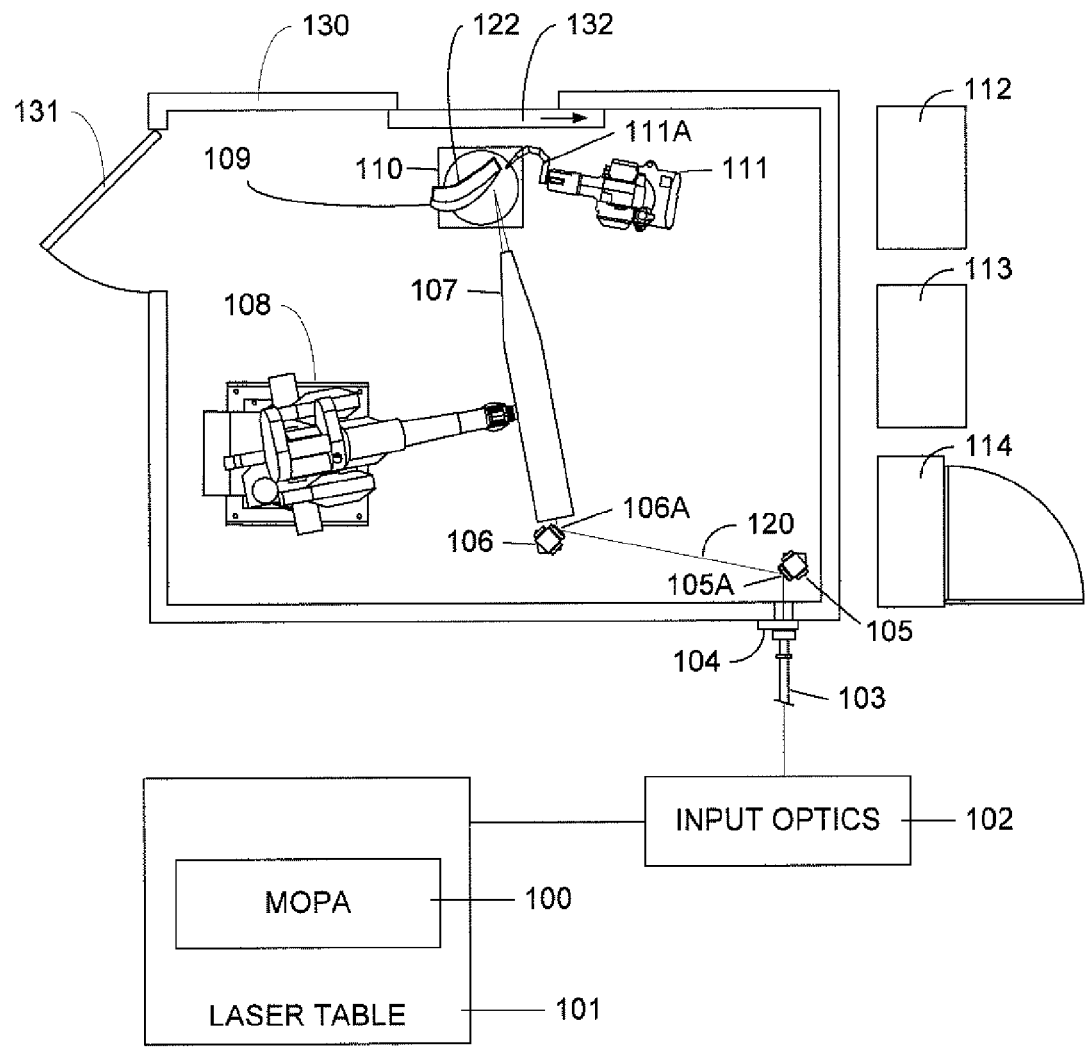
FIG. 9 is a diagram of an energy delivery system configured for laser peening a workpiece with a momentum trap as described herein.

FIG. 9 shows a schematic of a laser peening system using the compliant elastomer momentum trap 122 on the workpiece 109. This is not meant to be a scale design of an actual system but illustrates basic components and their layout. The system of FIG. 1 includes a laser 100 in a master oscillator/power amplifier configuration, such as described in U.S. Patent Application Publication entitled STIMULATED BRILLOUIN SCATTERING MIRROR SYSTEM, HIGH POWER LASER AND LASER PEENING METHOD AND SYSTEM USING SAME; Publication No. US-2005-0094256-A1 filed 28 Jan. 2004, by Dane et al., which is incorporated by reference as if fully set forth herein. Other laser energy sources can be used as well. For laser peening, the output of the laser system is pulses greater than 1 joule per pulse with the pulse width less than 30 nanoseconds, for example pulses having more than 20 joules per pulse and a pulse width between 10 and 20 nanoseconds can be used, and which have a wavelength substantially absorbed by the ablative layer on the surface to be peened. In this system, the laser 100 is mounted on a stable laser table 101. Output from the source of laser energy is applied to input optics 102 which condition the beam for delivery through a relay telescope 103 to a transmitting mirror 105A mounted on transmitting mirror gimbal 105. The transmitting mirror 105A reflects the beam to a receiving mirror 106A mounted on receiving mirror gimbal 106. The receiving mirror 106A on receiving mirror gimbal 106 is part of a robot mounted optical assembly 107, which is in turn positioned by robot 108. The robot mounted optical assembly 107 includes output optics for directing the beam to a target location on a surface of a workpiece 109. In this embodiment, the workpiece 109, with the compliant elastomer momentum trap 122, is mounted on a rotatable parts holder 110. A water delivery robot 111 is mounted near the parts holder 110, and includes a vessel 111A for delivery of tamping fluid in the laser peening application. The robot 111 in embodiments of the technology also controls placement of a coordinate measuring metrology touch probe (such as the Renishaw style) used during laser peening operations. A controller 112 for the robot 111, a controller 113 for the robot 108, and a controller 114 for coordinating operation of the robots and adjustable components in the beam delivery system and in the laser 100, and other controllable components, including a robot for handling the momentum trap 122, as illustrated below, are provided with the system.

The basic optical path from the input optics 102 to the target workpiece includes just two turns in this embodiment, which are controlled using high-speed, high-resolution gimbals. The optical path includes a segment 120, between the transmitting mirror 105A and the receiving mirror 106A, which is essentially straight and has a variable length through air, and a variable direction defined by the angle setting of the transmitting mirror gimbal. The variable length is controlled by the robot 108 based on the positioning of the optical assembly 107 when moving the beam line to a target location on the surface of the workpiece 109. Likewise, the variable direction is set using the gimbals 105, 106 according to the positioning of the optical assembly 107. In the embodiment illustrated, the segment 120 extends through free air, that is without an enclosure such as a tube. In other embodiments, a telescoping tube or other enclosure could be provided so long as it is sufficiently adjustable.

The water robot 111 is used to deliver the transparent tamping layer to the surface of the treated part. An alternative system integrates a water delivery vessel on to the robot 108 along with the robot mounted optical assembly 107.

A process chamber 130 is illustrated, including an access door 131 for technicians, a parts access door 132 which allows access to the parts holder 110, and a shutter 104 for admitting the laser radiation. The process chamber 130 allows provision of a controlled environment for the operation of the robot 108, with a parts holder 110 used to provide only limited positioning functions for the laser peening operation. The process chamber 130 is mounted on a platform, such as a foundation or movable plank, and the transmitting mirror gimbal 105, robot 108 with the robot mounted optical assembly 107, the robot 111, momentum trap robot (shown in FIGS. 10 and 11) and the rotatable parts holder 110 are all mounted thereon in a fixed spatial relationship. The laser 100 and input optics 102 are mounted on separate stages, closely coupled with the process chamber 130.

Figure 10:
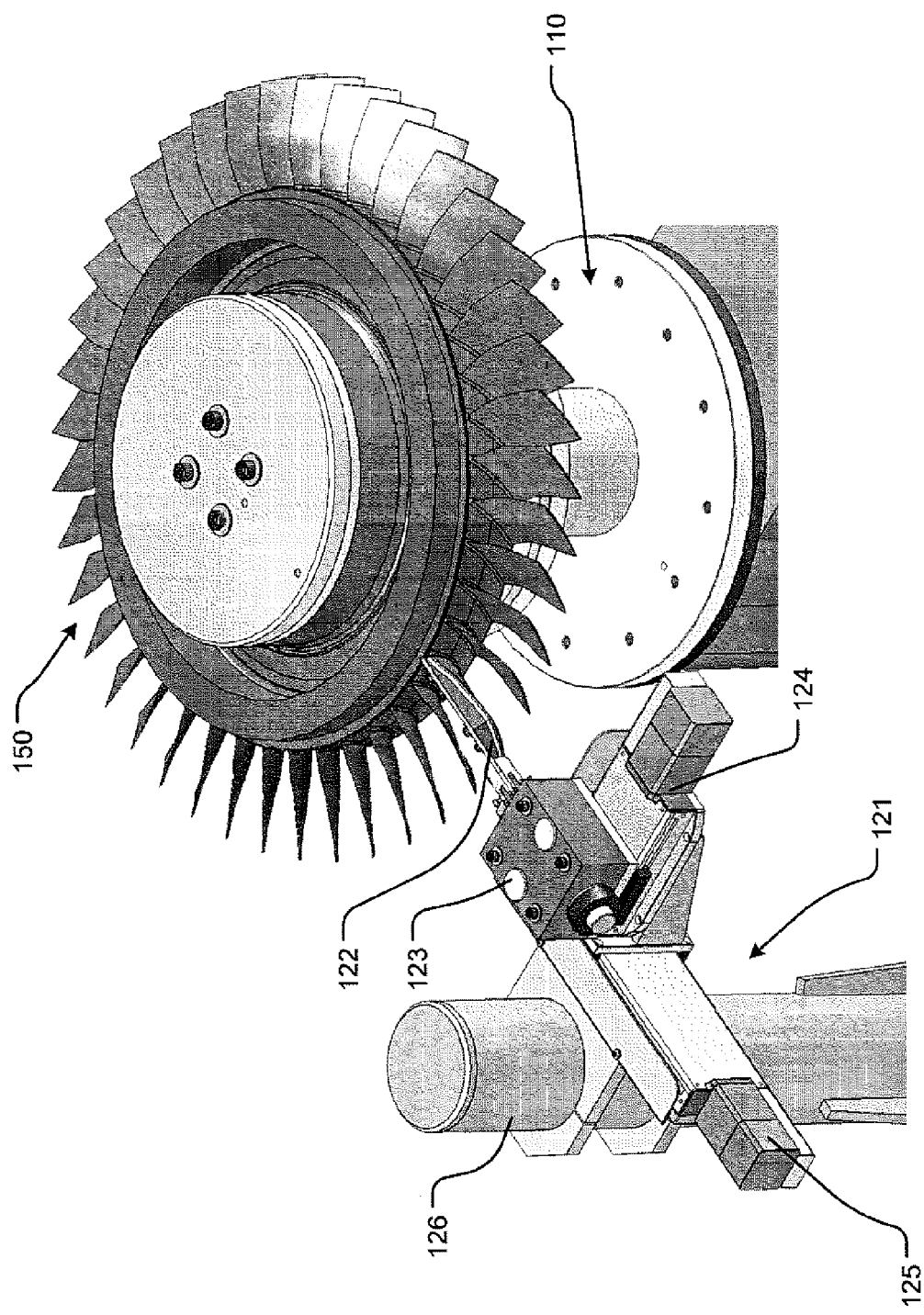
FIG. 10 illustrates a process for laser peening an integrated blade rotor using a momentum trap.

FIGS. 10 and 11 illustrate a mechanism for placing momentum trap 122, comprising a compliant acoustic coupler, during laser peening, on a fan blade of an integrated blade rotor 150 for a jet engine. The rotor 150 is mounted on rotatable parts holder 110 having a computer controlled positioning system 121 to position a selected blade for laser peening. The momentum trap 122 is mounted on a car 123 of a 3 dimensional positioning robot, having a first horizontal positioning axis 124 aligned tangentially with the rotor 150, a second horizontal positioning axis 125 aligned normal to the first horizontal positioning axis 124, and a vertical positioning axis 126. More details of the structure and operation of the momentum trap 122 are illustrated in FIG. 11. FIG. 11 is an expanded view of the momentum trap 122 coupled to a fan blade 140 on the integrated blade rotor 150 of FIG. 10. The momentum trap 122 comprises high density, acoustic impedance matched layer 141 in contact with the back of the blade 140 and a compliant, less dense layer 142 coupled to the layer 141 as described above. Also, a conformable layer 144 backs the layer 142 to form a composite structure secured to backing bar 145 by bolts or otherwise. The bar 145 is connected to the car 123 of the robot illustrated in FIG. 10.

The opposite surface of the fan blade 140 includes a region, such as a strip along the leading edge or trailing edge that is coated with an ablative material, such as black paint or tape, in preparation for laser peening. Laser pulses are directed along a path 147 from an angle above or below the rotor by the robot mounted optical assembly 107. Also, a stream of water or other tamping material is directed along a path 148 by water delivery robot 111.

In operation, a laser peening operation on the blades on the integrated blade rotor of FIGS. 10 and 11 includes as set of steps including placing the momentum trap on the selected blade and applying compressive force sufficient to establish gap free contact to the back of the blade, applying a pulse of tamping fluid to the blade from a direction effective to establish a smooth flow over a target spot on the blade, and applying a pulse of laser energy to the target spot. The procedure is repeated without moving the momentum trap until all spots in the target region have been peened. Then, the momentum trap is decoupled from the back of the blade, rotated and positioned on the front of the blade. The target area on the back of the blade is then peened, by applying a set of pulses of tamping fluid and laser energy across a target region. In the illustrated example, the front of the blade on the integrated blade rotor is peened in a strip about 2 to 8 millimeters wide along the leading edge and in another strip about 2 to 8 millimeters wide along the trailing edge. Likewise, the back of the blade on the integrated blade rotor is peened on the front of the blade in a strip about 2 to 8 millimeters wide along the leading edge opposite to the corresponding strip on the front of the blade, and in another strip about 2 to 8 millimeters wide along the trailing edge to the corresponding strip on the front of the blade. The rotor blade is less than 5 millimeters thick. The regions of the laser peened strips and the momentum trap prevent unwanted deformation of the leading and trailing edges of the blades due to laser peening.

A final very important application of the compliant acoustic coupler is to prevent the unwanted removal of the ablative coating from surfaces not being peened. The ablative coating can be either a layer of paint, plastic tape, or metal tape. When the acoustic wave strikes an interior surface of a treated part, the mechanical response of the unconstrained surface can break the bond between the ablative layer and the part, effectively removing the coating. This is a particular problem for parts with thin sections where little attenuation of the pressure wave occurs before the opposing surface is reached. The use of the acoustic absorber damps the motion of the surface, preserving the adhesion of the ablative layer. This allows the ablative layer to be applied to all treatment surfaces in a single step, prior to laser peening, lessening the need to reapply the coating (tape or paint) between successive treatments of opposing sides of thin section parts.

Since some embodiments of metal-filled elastomers conduct electrical current, it will be possible to sense contact of the acoustic coupler with the part being laser peened. Low voltage signals processed by a programmable logic controller can be used as inputs to the automation system to ensure that the momentum dump is correctly positioned for each part.

A compliant acoustic coupling material allows the intense longitudinal density waves generated by laser peening to be effectively transmitted past internal surfaces of a treated part, greatly attenuating the reflected tensile and compressive waves. The material used in the invention consists of a high density matrix of metallic particles uniformly dispersed in a compliant binder. The use of binders such as silicone, urethane, or EPDM (ethylene propylene diene monomer) allows the coupling material to readily conform to complex shapes. An evenly distributed filler of metallic powder (for example, silver or nickel) with a volume fraction of 30-40% results in a density in the range of 2-5 g/cc that can be tailored to provide a good match to the density of aluminum, titanium, or other alloys of interest. Unlike other acoustic couplers such as shaped metals or liquids, the rubber-based material also provides acoustic absorption, reducing the possibility of further internal reflections within the coupling material itself.

The use of the compliant acoustic coupler has utility across a broad range of laser peening applications. Initially, it will be very important in the laser peening of components having thin cross-sections (1-5 mm), attenuating the reflected acoustic wave from the back surface that can reduce induced surface stress as well as cause internal damage (spalling) in the metal. Further, it will also be very useful to control reflected waves around geometric features such as edges, inside and outside corners, filets, notches, holes, etc., where internal reflections can result in complex wave interaction inside the metal and can lead to unexpected and undesirable distributions of residual compressive stress through the part. It can also be used to protect ablative coatings from removal by acoustic waves striking the interior surfaces of laser peened components, away from areas being directly peened.

The process described herein is applicable to the manufacturing of a wide variety of metallic parts, including, for example, jet engine fan blades, fan hubs, gears, bearings, automotive and aviation structural members, connecting rods, crankshafts, and medical implants such as prosthetic joint replacement components.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for manufacturing a device including a metallic body having a surface, the surface including a first region and a second region, the method comprising:
conformally applying a compliant solid material to the first region of the metallic body, wherein the compliant solid material comprises a compliant binder material mixed with particles more dense than the binder material; and
directing pulses of laser energy to the second region, the pulses inducing pressure waves within the metallic body which propagate to the surface in the first region, wherein the compliant solid material acts as a momentum trap so that the pressure waves are at least partially coupled into the compliant solid material and attenuated outside of the metallic body.

2. The method of claim 1, wherein the particles more dense than the binder material comprise metal particles.

3. The method of claim 2, wherein the compliant binder material comprises an elastomer.

4. The method of claim 1, including applying the compliant solid material by compressing a compressible cushion on the compliant solid material to provide holding force across the first region of the surface.

5. The method of claim 1, wherein the compliant binder material comprises an elastomer, and including forming the compliant solid material by molding the elastomer into a shape substantially matching the first region on the surface.

6. The method of claim 1, including forming the compliant solid material by first partially filling a mold with the compliant binder material filled with a matrix of the particles into a shape substantially matching the first region on the surface, and partially curing the compliant binder material filled with a matrix of the particles to form a layer of partially cured material with shape substantially matching the first region on the surface, and then filling remaining portions of the mold with the compliant binder material not filled with the matrix of particles, and curing the molded material.

7. The method of claim 1, wherein the metallic body comprises a thin section having a thickness about 5 mm or less, and wherein the first and second regions are on opposite sides of the thin section.

8. The method of claim 1, wherein the surface of the metallic body has an outside corner, and wherein the first and second regions are on opposite sides of the corner.

9. The method of claim 1, wherein the metallic body comprises a hole in the second region, the hole having an interior wall, and wherein the first region is on the interior wall.

10. The method of claim 1, wherein the metallic body comprises a blade with an edge, and wherein the first region and second region are adjacent to and on opposite sides of the edge.

11. The method of claim 1, wherein the compliant binder material comprises urethane.

12. The method of claim 1, wherein the compliant binder material comprises silicone.

13. The method of claim 1, wherein the compliant binder material comprises an ethyl propylene diene monomer.

14. The method of claim 1, wherein the pulses have a peak irradiance higher than 0.5 GW/cm$^2$.

15. A method for laser shock processing a device including a metallic body having a surface, the surface including a first region and a second region, the method comprising:
conformally applying a compliant solid material to the first region of the metallic body, wherein the compliant solid material comprises a compliant binder material mixed with particles more dense than the binder material;
applying a layer of ablative material to the second region of the metallic body;
applying a tamping material over the layer of ablative material; and
directing an array of pulses of laser energy through the tamping material to the layer of ablative material in the second region, the pulses peening the second region and inducing pressure waves within the metallic body which propagate to the surface in the first region, wherein the compliant solid material acts as a momentum trap so that the pressure waves are at least partially coupled into the compliant solid material and attenuated outside of the metallic body.

16. The method of claim 15, wherein the particles more dense than the binder material comprise metal particles.

17. The method of claim 16, wherein the compliant binder material comprises an elastomer.

18. The method of claim 15, including applying the compliant solid material by compressing a compressible cushion on the compliant solid material to provide holding force across the first region of the surface.

19. The method of claim 15, wherein the compliant binder material comprises an elastomer, and including forming the compliant solid material by molding the elastomer into a shape substantially matching the first region on the surface.

20. The method of claim 15, including forming the compliant solid material by first partially filling a mold with the compliant binder material filled with a matrix of the particles into a shape substantially matching the first region on the surface, and partially curing the compliant binder material filled with a matrix of the particles to form a layer of partially cured material with shape substantially matching the first region on the surface, and then filling remaining portions of the mold with the compliant binder material not filled with the matrix of particles, and curing the molded material.

21. The method of claim 15, wherein the metallic body comprises a thin section having a thickness about 5 mm or less, and wherein the first and second regions are on opposite sides of the thin section.

22. The method of claim 15, wherein the surface of the metallic body has an outside corner, and wherein the first and second regions are on opposite sides of the corner.

23. The method of claim 15, wherein the metallic body comprises a hole in the second region, the hole having an interior wall, and wherein the first region is on the interior wall.

24. The method of claim 15, wherein the metallic body comprises a blade with an edge, and wherein the first region and second region are adjacent to and on opposite sides of the edge.

25. The method of claim 15, wherein the compliant binder material comprises urethane.

26. The method of claim 15, wherein the compliant binder material comprises silicone.

27. The method of claim 15, wherein the compliant binder material comprises an ethyl propylene diene monomer.

28. The method of claim 15, wherein the pulses have a peak irradiance higher than 0.5 GW/cm$^2$.

29. A method for manufacturing a turbine fan blade having a front side, a back side, a leading edge and a trailing edge, the method comprising:
mounting the blade on a part holder;
conformally applying a solid momentum trap to one of the front and back sides of the blade to establish a gap free contact over a portion of said one of the front and back sides, wherein the solid momentum trap comprises a compliant binder material mixed with particles more dense than the binder material; and
directing pulses of laser energy and tamping fluid to impact a region on other of the front and back sides, the pulses inducing pressure waves within the blade, so that the pressure waves are at least partially coupled into the momentum trap and attenuated outside of the fan blade.

30. The method of claim 29, wherein the blade comprises a selected blade on an integrated blade rotor.

31. The method of claim 29, wherein said region comprises a strip along a leading edge of the blade.

32. The method of claim 29, wherein said region comprises a strip along a trailing edge of the blade.

33. The method of claim 29, including:
while the blade is mounted on the part holder, moving the solid momentum trap to said other of the front and back sides; and
directing pulses of laser energy and tamping fluid to impact a region on one of the front and back sides.

* * * * *